United States Patent
Matsushita et al.

(10) Patent No.: US 7,588,334 B2
(45) Date of Patent: Sep. 15, 2009

(54) CONTACT LENS

(75) Inventors: Ryo Matsushita, Kasugai (JP); Kazuharu Niwa, Kasugai (JP); Akihisa Sugiyama, Kasugai (JP)

(73) Assignee: Menicon Co., Ltd., Aichi (JP)

( * ) Notice: Subject to any disclaimer, the term of this patent is extended or adjusted under 35 U.S.C. 154(b) by 161 days.

(21) Appl. No.: 11/597,791

(22) PCT Filed: May 28, 2004

(86) PCT No.: PCT/JP2004/007388

§ 371 (c)(1), (2), (4) Date: Nov. 28, 2006

(87) PCT Pub. No.: WO2005/116728

PCT Pub. Date: Dec. 8, 2005

(65) Prior Publication Data

US 2007/0232755 A1 Oct. 4, 2007

(51) Int. Cl.
*G02C 7/04* (2006.01)
(52) U.S. Cl. .................. 351/160 H; 351/160 R
(58) Field of Classification Search ............. 351/160 R, 351/160 H
See application file for complete search history.

(56) References Cited

U.S. PATENT DOCUMENTS 3,944,347 A * 3/1976 Barkdoll et al. ......... 351/160 R
4,166,255 A * 8/1979 Graham .................. 351/160 H
2004/0212779 A1 * 10/2004 Dahi et al. ............... 351/160 R

FOREIGN PATENT DOCUMENTS

| JP | 49-87345 | 8/1974 |
|---|---|---|
| JP | 50-25245 | 3/1975 |
| JP | 56-50313 | 5/1981 |
| JP | 62-50126 | 3/1987 |
| JP | 6-121826 | 5/1994 |
| JP | 7-90030 | 4/1995 |
| JP | 2000-343539 | 12/2000 |

OTHER PUBLICATIONS

International Search Report; PCT/JP2004/007388; Date of mailing: Sep. 7, 2004.

* cited by examiner

*Primary Examiner*—Ricky L Mack
*Assistant Examiner*—James R Greece
(74) *Attorney, Agent, or Firm*—Antonelli, Terry, Stout & Kraus, LLP.

(57) ABSTRACT

A contact lens excellent in optical property, offering favorable feeling during the use thereof, and capable of continuous uses, which is composed of a hard portion in the central part and a soft portion in the periphery of the central part is provided. The contact lens comprising two kinds of polymers and having a hard portion arranged in the central part thereof and a soft portion arranged in the periphery of the central part, wherein a monomer mixture forming the hard portion contains at least one silicone-containing monomer, and the monomer mixture forming the hard portion and a monomer mixture forming the soft portion each contain at least one common hydrophilic monomer.

10 Claims, 1 Drawing Sheet

CONTACT LENS

RELATED APPLICATION

This application is a U.S. national phase application filed under 35 U.S.C. §371 of International Application No. PCT/JP2004/007388 filed May 28, 2004.

TECHNICAL FIELD

The present invention relates to a contact lens (hereinafter referred to as CL) excellent in optical property, offering favorable feeling during the use thereof, and capable of continuous uses, which is composed of a hard portion in the central part and a soft portion in the periphery of the central part.

BACKGROUND ART

In a CL composed of a hard portion in the central part and a soft portion in the periphery thereof, the edge part is composed of a soft portion, which reduces feeling of foreign objects during the use thereof, thus, some of such CL have been produced (JP-A-49-87345, JP-A-56-50313 and JP-A-50-25245).

JP-A-49-87345 discloses a preparation process of a CL comprising a hard transparent body in the central part and a soft transparent polymer in the peripheral part thereof, which is produced from a plate material obtained by forming a cylindrical laminate having a soft transparent polymer layer around the cylindrical hard transparent body closely bonded therewith by polymerizing a monomer providing a soft transparent polymer that is softened and swelled by water around the cylindrical hard transparent body, and thinly cutting the laminate in the cross sectional direction.

JP-A-56-50313 discloses a CL comprising a central part of the lens having a larger hardness than a peripheral skirt part and a polymer matrix capable of compounding with a material forming the central part of a lens with hydrophilic property and water swellability.

However, in the CL described in these references, oxygen permeability of the obtained CL is low, since a silicone-containing monomer is not contained in a monomer mixture forming a hard portion, and when the CL is continuously used, a possibility of a deficiency in oxygen supply to corneas is high. Further, a previously prepared hard portion is arranged in the center, and a monomer mixture forming a soft portion is polymerized in the periphery thereof. In this case, the hard portion and the soft portion are not favorably connected, and there has been a problem of inferiority in terms of strength. In addition, centering of the hard portion requires complicated procedures.

JP-A-50-25245 discloses a preparation process of a CL comprising a hard material in the central part and a soft material in the periphery of the central part, which is prepared from a laminate arranging a transparent material (a hard material) that is not softened by water inside of a cylindrical or plate material having a void and comprising a transparent material (a soft material) that is softened by water. However, a silicone-containing monomer is not contained in a monomer mixture forming the hard material, thus, oxygen permeability of the obtained CL is low, and when the CL is continuously used, there is a possibility of a deficiency in oxygen supply to corneas, and since a hydrophilic monomer is not also contained, connection with the soft material is not favorably carried out, and there is a problem in inferiority in terms of strength.

An object of the present invention is to provide a CL excellent in optical property, offering favorable feeling during the use thereof, and capable of continuous use, which is composed of a hard portion in the central part and a soft portion in the periphery of the central part.

DISCLOSURE OF INVENTION

Figure 1:
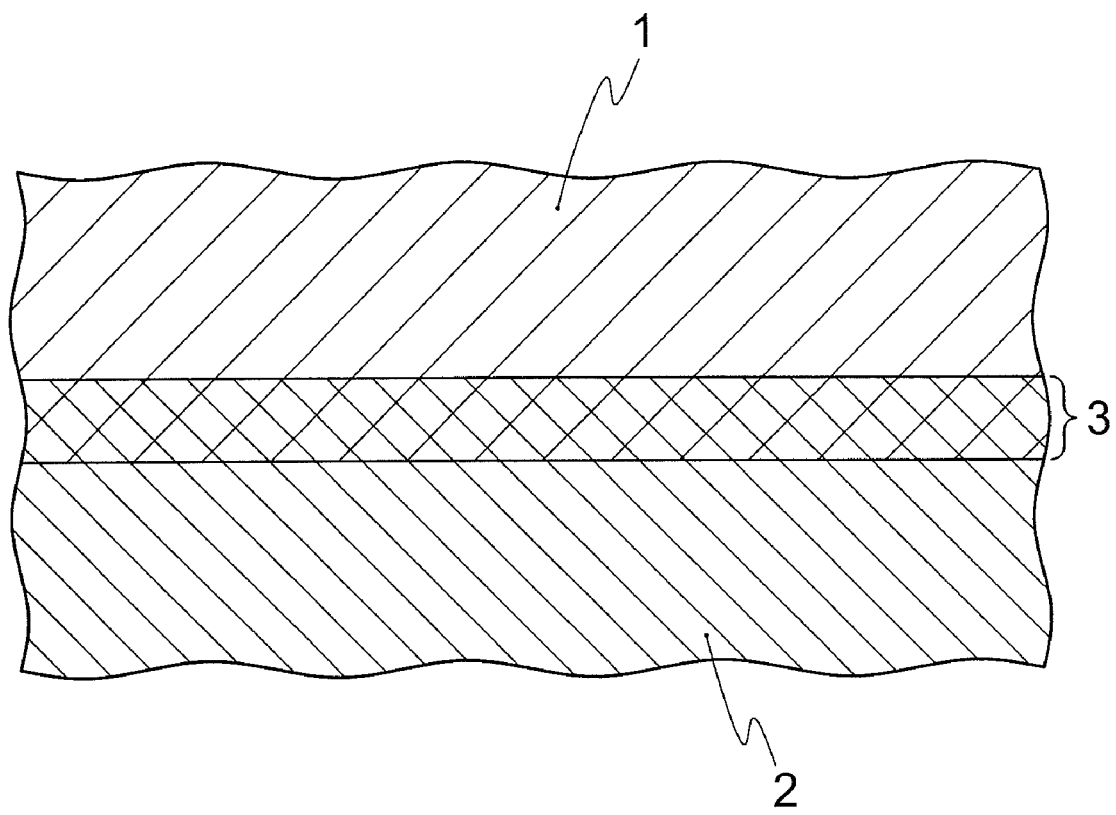
FIG. 1 is a schematic cross sectional view of a portion of a contact lens of the present invention depicting a soft portion of the contact lens, a hard portion of the contact lens, and a phase boundary of common hydrophilic components at an interpenetrating polymer network formed in a joint part between the soft and hard portions.

Namely, the present invention relates to a contact lens comprising two kinds of polymers and having a hard portion arranged in the central part of the contact lens and a soft portion arranged in the periphery of the central part, wherein a monomer mixture forming said hard portion contains at least one silicone-containing monomer, and the monomer mixture forming said hard portion and a monomer mixture forming said soft portion contain at least one common hydrophilic monomer.

It is preferable that a water content of a homopolymer a hydrophilic monomer having the maximum water content in the monomer mixture forming the hard portion does not exceed a water content of a homopolymer a hydrophilic monomer having the maximum water content in the monomer mixture forming the soft portion.

It is preferable that a weight ratio of the hydrophilic monomer having the maximum water content in the monomer mixture forming the hard portion to the whole polymer components in the monomer mixture forming the hard portion does not exceed a weight ratio of the hydrophilic monomer having the maximum water content in the monomer mixture forming the soft portion to the whole polymerization components in the monomer mixture forming the soft portion, and a weight ratio of the whole hydrophilic monomers contained in the monomer mixture forming the hard portion to the whole polymerization components in the monomer mixture forming the hard portion does not exceed a weight ratio of the whole hydrophilic monomers contained in the monomer mixture forming the soft portion to the whole polymerization components in the monomer mixture forming the soft portion.

It is preferable that a ratio of a water content of homopolymers of hydrophilic monomers commonly contained in the monomer mixture forming the hard portion and the monomer mixture forming the soft portion to a water content of a copolymer obtained by polymerizing the monomer mixture forming said soft portion is not more than 2.

It is preferable that the hydrophilic monomer commonly contained in the monomer mixture forming the hard portion and the monomer mixture forming the soft portion is selected from the group consisting of hydroxymethyl (meth)acrylate, hydroxyethyl (meth)acrylate, hydroxybutyl (meth)acrylate, and hydroxypropyl (meth)acrylate.

It is preferable that the silicone-containing monomer is a styrene which has silane or a siloxane bond and is represented by the general formula (I):

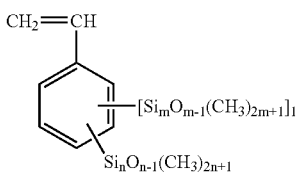

(I)

(wherein 1 is O or 1, and n and m are integers of 1 to 15), and more preferably tris(trimethylsiloxy)silylstyrene (1=0, n=4).

It is preferable that the silicone-containing monomer is a (meth)acrylate which has a siloxane bond and is represented by the general formula (II):

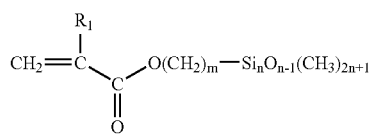

(II)

(wherein $R_1$ is H or $CH_3$, m is an integer of 1 to 5, and n is an integer of 1 to 15), and more preferably tris(trimethylsiloxy) silylpropyl acrylate ($R_1$=H, m=3, n=4) or tris(trimethylsiloxy)silylpropyl methacrylate ($R_1$=$CH_3$, m=3, n=4).

BEST MODE FOR CARRYING OUT THE INVENTION

The present invention relates to a CL comprising two kinds of polymers and having a hard portion arranged in the central part and a soft portion arranged in the periphery of the central part, wherein at least one silicone-containing monomer is contained in a monomer mixture forming the hard portion (hereinafter, referred to as a hard portion-forming monomer mixture), and at least one common hydrophilic monomer is contained in the hard portion-forming monomer mixture and a monomer mixture forming the soft portion (hereinafter, referred to as a soft portion-forming monomer mixture).

In the CL of the present invention, at least one silicone-containing monomer is contained in the hard portion-forming monomer mixture.

By containing at least one silicone-containing monomer in the hard portion-forming monomer mixture, the obtained CL has a high oxygen permeation coefficient (Dk), and when the CL is continuously used, oxygen supply to corneas comes to be favorably carried out.

It is preferable that an oxygen permeation coefficient (Dk) of the CL of the present invention is at least $64\times10^{-11}$ ($cm^2$/sec)·($mLO_2$/(mL×mmHg)). When the oxygen permeation coefficient is less than $64\times10^{-11}$ ($cm^2$/sec)·($mLO_2$/(mL× mmHg)), in case of continuously using the CL, oxygen supply to corneas is lowered, and ophthalmopathy tends to be caused.

Examples of the silicone-containing monomer are (meth)acrylate having styrene which contains silane or a siloxane bond and is represented by the general formula (I):

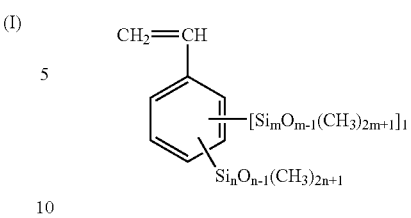

(I)

(wherein 1 is 1 or 0, and n and m are integers of 1 to 15), (meth)acrylate which contains a siloxane bond and is represented by the general formula (II):

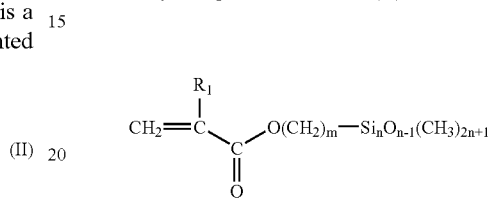

(II)

(wherein $R_1$ is H or $CH_3$, m is an integer of 1 to 5, and n is an integer of 1 to 15), polysiloxane macromonomer, and a urethane bond-containing polysiloxane macromonomer, but examples are not limited only thereto. Among these, (meth)acrylate having styrene which contains silane or a siloxane bond and is represented by the general formula (I) or (meth)acrylate which contains a siloxane bond and is represented by the general formula (II) is preferable from the viewpoint that a high oxygen permeation coefficient is obtained in the hard-portion forming polymer.

Herein, "(meth)acrylate" indicates "acrylate and/or methacrylate", and other (meth)acrylate derivatives indicate the same meaning.

Specific examples of (meth)acrylate having styrene which contains silane or a siloxane bond and is represented by the general formula (I) are trimethylsilylstyrene, pentamethyldisiloxanylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, bis(trimethylsiloxy)methylsilylstyrene, tris(trimethylsiloxy)silylstyrene, trimethylsiloxy.pentamethyldisiloxy.methylsilylstyrene, tris (pentamethyldisiloxy)silylstyrene, (tris.trimethylsiloxy) siloxanyl.bis(trimethylsiloxy) silylstyrene, bis (heptamethyltrisiloxy)methylsilylstyrene, tris (methylbis.trimethylsiloxy.siloxy)silylstyrene, trimethylsiloxy.bis(tris.trimethylsiloxy.siloxy)silylstyrene, heptakis(trimethylsiloxy)trisiloxanylstyrene, nonamethyltetrasiloxy.undecylmethylpentasiloxy.methylsilylstyrene, tris (tris.trimethylsiloxy.siloxy)silylstyrene, (tristrimethylsiloxy.hexamethyl)tetrasiloxy.(tris.trimethylsiloxy)siloxy.tri methylsiloxysilylstyrene, nonakis(trimethylsiloxy)tetrasiloxanylstyrene, and bis(tridecamethylhexasiloxy)methylsilylstyrene. These can be used alone or at least 2 of these can be mixed to be used. Among these, tris(trimethylsiloxy)silylstyrene (1=0, n=4) is preferable from the viewpoint of having an excellent oxygen permeation coefficient.

Specific examples of (meth)acrylate which contains a siloxane bond and is represented by the general formula (II) are trimethylsilylmethyl (meth)acrylate, trimethylsilylethyl (meth)acrylate, trimethylsilylpropyl (meth)acrylate, pantamethyldisiloxanylmethyl(meth)acrylate, pantamethyldisiloxanylethyl (meth)acrylate, pantamethyldisiloxanylpropyl (meth)acrylate, methylbis(trimethylsiloxy) silylmethyl (meth)acrylate, methylbis(trimethylsiloxy) silylethyl (meth)acrylate, methylbis(trimethylsiloxy)silylpropyl (meth)acrylate, tris(trimethylsiloxy) silylmethyl (meth)acrylate, tris(trimethylsiloxy) silylethyl (meth)acrylate, tris(trimethylsiloxy) silylpropyl (meth)acrylate, mono[methylbis(trimethylsiloxy)siloxy]bis(trimethylsiloxy)silylmethyl (meth)acrylate, mono[methylbis(trimethylsiloxy)siloxy]bis(trimethylsiloxy)silylethyl (meth)acrylate, mono[methylbis(trimethylsiloxy)siloxy]bis(trimethylsiloxy)silylpropyl (meth)acrylate, tris[methylbis(trimethylsiloxy)siloxy]silylmethyl (meth)acrylate, tris[methylbis(trimethylsiloxy)siloxy]silylethyl (meth)acrylate, and tris[methylbis(trimethylsiloxy) siloxy]silylpropyl (meth)acrylate. Among these, tris(trimethylsiloxy)silylpropyl (meth)acrylate (m=3, n=4) is preferable from the viewpoint of having an excellent oxygen permeation coefficient.

When the oxygen permeability of the obtained CL is intended to be further improved, a polysiloxane macromonomer can be used. In addition, by using a urethane bond-containing polysiloxane macromonomer as a CL material, the CL material has a bond with more elasticity due to a urethane bond and is reinforced due to a siloxane portion without damaging flexibility and oxygen permeability of the material, and rebound resilience is provided to eliminate brittleness and a property to improve mechanical strength can be imparted.

A urethane bond-containing polysiloxane macromonomer has ethylenic unsaturated groups that are polymerizable groups on both ends of a molecule and is copolymerized with other copolymer components through the polymerizable groups, thus, the urethane bond-containing polysiloxane macromonomer has an excellent property such as imparting not only physical reinforcing effects due to conjuncture of molecules but also reinforcing effects due to a chemical bond (covalent bond) to the obtained intraocular lens. Namely, the urethane bond-containing polysiloxane macromonomer functions as a high molecular weight crosslinking monomer.

The urethane bond-containing polysiloxane macromonomer is a polysiloxane macromonomer in which a polymerizable group represented by the general formula (1):

$$A^1-U^1-(-S^1-U^2-)_n-S^2-U^3-A^2 \quad (1)$$

[wherein $A^1$ is a group represented by the general formula (2):

$$Y^{21}-Z^{21}-R^{31}- \quad (2)$$

(wherein $Y^{21}$ is a (meth)acryloyl group, a vinyl group or an allyl group, $Z^{21}$ is an oxygen atom or a direct bond, and $R^{31}$ is a direct bond or an alkylene group having 1 to 12 carbon atoms and having a linear chain, a branched chain or an aromatic ring);

$A^2$ is a group represented by the general formula (3):

$$-R^{34}-Z^{22}-Y^{22} \quad (3)$$

(wherein $Y^{22}$ is a (meth)acryloyl group, a vinyl group or an allyl group, $Z^{22}$ is an oxygen atom or a direct bond, and $R^{34}$ is a direct bond or an alkylene group having 1 to 12 carbon atoms and having a linear chain, a branched chain or an aromatic ring), (however, $Y^{21}$ in the general formula (2) and $Y^{22}$ in the general formula (3) may be the same or different);

$U^1$ is a group represented by the general formula (4):

$$-X^{21}-E^{21}-X^{25}-R^{32}- \quad (4)$$

(wherein $X^{21}$ and $X^{25}$ are respectively independently selected from a direct bond, an oxygen atom and an alkylene glycol group, $E^{21}$ is a —NHCO— group (however, in this case, $X^{21}$ is a direct bond, $X^{25}$ is an oxygen atom or an alkylene glycol group, and $E^{21}$ forms a urethane bond with $X^{25}$), a —CONH— group (however, in this case, $X^{21}$ is an oxygen atom or an alkylene glycol group, $X^{25}$ is a direct bond, and $E^{21}$ forms a urethane bond with $X^{21}$), or a bivalent group derived from diisocyanate selected from the group consisting of saturated- or unsaturated-aliphatic groups, alicyclic groups and aromatic groups (however, in this case, $X^{21}$ and $X^{25}$ are respectively independently selected from an oxygen atom and an alkylene glycol group, and $E^{21}$ forms two urethane bonds between $X^{21}$ and $X^{25}$), and $R^{32}$ is an alkylene group having 1 to 6 carbon atoms and having a linear chain or a branched chain);

$S^1$ and $S^2$ are respectively independently groups represented by the general formula (5):

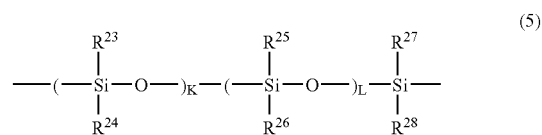

(wherein $R^{23}$, $R^{24}$, $R^{25}$, $R^{26}$, $R^{27}$ and $R^{28}$ are respectively independently alkyl groups having 1 to 6 carbon atoms, or alkyl groups or phenyl groups which are substituted with fluorine, K is an integer of 10 to 100, L is 0 or an integer of 1 to 90, and K+L is an integer of 10 to 100);

$U^2$ is a group represented by the general formula (6):

$$-R^{37}-X^{27}-E^{24}-X^{28}-R^{38}- \quad (6)$$

(wherein $R^{37}$ and $R^{38}$ are respectively independently alkylene groups having 1 to 6 carbon atoms and having a linear chain or a branched chain; $X^{27}$ and $X^{28}$ are respectively independently oxygen atoms or alkylene glycol groups; $E^{24}$ is a bivalent group derived from diisocyanate selected from the group consisting of saturated- or unsaturated-aliphatic groups, alicyclic groups and aromatic groups (however, in this case, $E^{24}$ forms two urethane bonds between $X^{27}$ and $X^{28}$));

$U^3$ is a group represented by the general formula (7):

$$-R^{33}13\ X^{26}-E^{22}-X^{22}- \quad (7)$$

(wherein $R^{33}$ is an alkylene group having 1 to 6 carbon atoms and having a linear chain or a branched chain, $X^{22}$ and $X^{26}$ are respectively independently selected from a direct bond, an oxygen atom and an alkylene glycol group, $E^{22}$ is a —NHCO— group (however, in this case, $X^{22}$ is an oxygen atom or an alkylene glycol group, $X^{26}$ is a direct bond, and $E^{22}$ forms a urethane bond with $X^{22}$), a —CONH— group (however, in this case, $X^{22}$ is a direct bond, $X^{26}$ is an oxygen atom or an alkylene glycol group, and $E^{22}$ forms a urethane bond with $X^{26}$), or a bivalent group derived from diisocyanate selected from the group consisting of saturated- or unsaturated-aliphatic groups, alicyclic groups and aromatic groups (however, in this case, $X^{22}$ and $X^{26}$ are respectively independently selected from an oxygen atom and an alkylene glycol group, and $E^{22}$ forms two urethane bonds between $X^{22}$ and $X^{26}$)); and n represents 0 or an integer of 1 to 10] is bonded with a siloxane main chain through at least one urethane bond.

In the general formula (1), as described above, $A^1$ is a group represented by the general formula (2):

$$Y^{21}\text{-}Z^{21}\text{-}R^{31}— \qquad (2)$$

(wherein $Y^{21}$, $Z^{21}$ and $R^{31}$ are the same as described above), and $A^2$ is a group represented by the general formula (3):

$$—R^{34}\text{-}Z^{22}\text{-}Y^{22} \qquad (3)$$

(wherein $Y^{22}$, $Z^{22}$ and $R^{34}$ are the same as described above).

Both $Y^{21}$ and $Y^{22}$ are polymerizable groups, and these are preferably acryloyl groups from the viewpoint of being easily copolymerized with a hydrophilic monomer (D).

Both $Z^{21}$ and $Z^{22}$ are oxygen atoms or direct bonds, and these are preferably oxygen atoms.

Both $R^{31}$ and $R^{34}$ are direct bonds or alkylene groups having 1 to 12 carbon atoms and having a linear chain, a branched chain or an aromatic ring, and these are preferably ethylene groups, propylene groups, or butylene groups.

All of $U^1$, $U^2$ and $U^3$ represent groups containing a urethane bond in a molecular chain of the compound (A).

In $U^1$ and $U^3$, as described above, $E^{21}$ and $E^{22}$ respectively represent —CONH— groups, —NHCO— groups, or bivalent groups derived from diisocyanate selected from the group consisting of saturated- or unsaturated-aliphatic groups, alicyclic groups and aromatic groups. Herein, examples of the bivalent group derived from diisocyanate selected from the group consisting of saturated- or unsaturated-aliphatic groups, alicyclic groups and aromatic groups are bivalent groups derived from saturated aliphatic diisocyanate such as ethylene diisocyanate, 1,3-diisocyanate propane and hexamethylene diisocyanate; bivalent groups derived from alicyclic diisocyanate such as 1,2-diisocyanate cyclohexane, bis(4-isocyanate cyclohexyl)methane, and isophorone diisocyanate; bivalent groups derived from aromatic diisocyanate such as tolylenediisocyanate and 1,5-diisocyanate naphthalene; and bivalent groups derived from unsaturated aliphatic diisocyanate such as 2,2'-diisocyanate diethyl fumarate. Among these, a bivalent group derived from hexamethylene diisocyanate, a bivalent group derived from tolylenediisocyanate and a bivalent group derived from isophorone diisocyanate are preferable from the viewpoint that these are relatively easily available and strength is easily imparted.

In $U^1$, when $E^{21}$ is a —NHCO— group, $X^{21}$ is a direct bond, $X^{25}$ is an oxygen atom or an alkylene glycol group, $E^{21}$ forms a urethane bond represented by the formula: —NHCOO— with $X^{25}$. When $E^{21}$ is a —CONH— group, $X^{21}$ is an oxygen atom or an alkylene glycol group, $X^{25}$ is a direct bond, and $E^{21}$ forms a urethane bond represented by the formula: —OCONH— with $X^{21}$. Further, when $E^{21}$ is the above-described bivalent group derived from diisocyanate, $X^{21}$ and $X^{25}$ are respectively independently selected from oxygen atoms and preferably alkylene glycol groups having 1 to 6 carbon atoms, and $E^{21}$ forms two urethane bonds between $X^{21}$ and $X^{25}$. $R^{32}$ is an alkylene group having 1 to 6 carbon atoms and having a linear chain or a branched chain.

In $U^2$, $E^{24}$ represents a bivalent group derived from diisocyanate selected from the group consisting of saturated- or unsaturated-aliphatic groups, alicyclic groups and aromatic groups, as described above. Herein, examples of the bivalent group derived from diisocyanate selected from the group consisting of saturated- or unsaturated-aliphatic groups, alicyclic groups and aromatic groups are the same bivalent groups as in the case of the above-described $U^1$ and $U^3$. Among these, a bivalent group derived from hexamethylene diisocyanate, a bivalent group derived from tolylenediisocyanate and a bivalent group derived from isophorone diisocyanate are preferable from the viewpoint that these are relatively easily available and strength is easily imparted. In addition, $E^{24}$ forms two urethane bonds between $X^{27}$ and $X^{28}$. $X^{27}$ and $X^{28}$ are respectively independently oxygen atoms or preferably alkylene glycol groups having 1 to 6 carbon atoms, and $R^{37}$ and $R^{38}$ are respectively independently alkylene groups having 1 to 6 carbon atoms and having a linear chain or a branched chain.

In $U^3$, $R^{33}$ is an alkylene group having 1 to 6 carbon atoms and having a linear chain or a branched chain. When $E^{22}$ is a —NHCO— group, $X^{22}$ is an oxygen atom or an alkylene glycol group, $X^{26}$ is a direct bond, and $E^{22}$ forms a urethane bond represented by the formula: —NHCOO— with $X^{22}$. When $E^{22}$ is a —CONH— group, $X^{22}$ is a direct bond, $X^{26}$ is an oxygen atom or an alkylene glycol group, and $E^{22}$ forms a urethane bond represented by the formula: —OCONH— with $X^{26}$. Further, when $E^{22}$ is the above-described bivalent group derived from diisocyanate, $X^{22}$ and $X^{26}$ are respectively independently selected from oxygen atoms and preferably alkylene glycol groups having 1 to 6 carbon atoms, and $E^{22}$ forms two urethane bonds between $X^{22}$ and $X^{26}$.

Herein, an example of an alkylene glycol group preferably having 1 to 20 carbon atoms in the above described $X^{21}$, $X^{25}$, $X^{27}$, $X^{28}$, $X^{22}$ and $X^{26}$ is a group represented by the general formula (8):

$$—O—(C_xH_{2x}—O)_y— \qquad (8)$$

(wherein x is an integer of 1 to 4, and y is an integer of 1 to 5).

Both $S^1$ and $S^2$ are groups represented by the general formula (5), as described above.

In the general formula (5), as described above, $R^{23}$, $R^{24}$, $R^{25}$, $R^{26}$, $R^{27}$ and $R^{28}$ are respectively independently alkyl groups having 1 to 6 carbon atoms, or alkyl groups and phenyl groups which are substituted with fluorine.

Examples of the alkyl group substituted with fluorine are 3,3,3-trifluoro-n-propyl group, 3,3,3-trifluoroisopropyl group, 3,3,3-trifluoro-n-butyl group, 3,3,3-trifluoroisobutyl group, 3,3,3-trifluoro-sec-butyl group, 3,3,3-trifluoro-t-butyl group, 3,3,3-trifluoro-n-pentyl group, 3,3,3-trifluoroisopentyl group, 3,3,3-trifluorothiopentyl group, and 3,3,3-trifluorohexyl group. Further in the present invention, when a compound (A) having the alkyl group substituted with fluorine is used and the amount thereof is large, anti-lipid fouling property of the obtained intraocular lens material tends to be improved.

K is an integer of 10 to 100, L is 0 or an integer of 1 to 90, and K+L is preferably an integer of 10 to 100, and more preferably an integer of 10 to 80. When K+L is more than 100, a molecular weight of a urethane group-containing polysiloxane macromonomer is large, and its compatibility with a hydrophilic monomer becomes poor, thus, it is not homogeneously dissolved in compounding or phase separation is caused at polymerization to show white turbidity, and there is a tendency that a homogeneous transparent intraocular lens material can not be obtained. When K+L is less than 10, oxygen permeability of the obtained lens is low, and flexibility thereof tends to be also lowered.

Further, n is preferably 0 or an integer of 1 to 10. When n is more than 10, a molecular weight of a urethane group-containing polysiloxane macromonomer is large, its compatibility with a hydrophilic monomer becomes poor, thus, it is not homogeneously dissolved in compounding, or phase separation is caused to show white turbidity, and there is a tendency that homogeneous transparent intraocular lens material can not be obtained. n is more preferably 0 or an integer of 1 to 5.

The urethane group-containing polysiloxane macromonomer is a polysiloxane macromonomer in which a polymerizable group represented by the general formula (9):

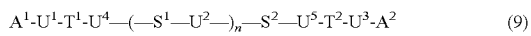

$$A^1\text{-}U^1\text{-}T^1\text{-}U^4\text{---}(\text{---}S^1\text{---}U^2\text{---})_n\text{---}S^2\text{---}U^5\text{-}T^2\text{-}U^3\text{-}A^2 \quad (9)$$

[wherein $A^1$, $A^2$, $U^1$, $U^2$, $U^3$, $S^1$, $S^2$ and n are the same as in the general formula (1), $U^4$ and $U^5$ are the same as $U^1$ and $U^3$, respectively. However, $Y^{21}$ and $Y^{22}$ in $A^1$ and $A^2$ are a (meth)acryloyl group, a vinyl group or an allyl group;

$T^1$ and $T^2$ are hydrophilic polymer-containing segments or hydrophilic oligomer-containing segments represented by the general formula (10):

$$\text{-Q-(CH}_2\text{CHD-Q-})_n\text{-} \quad (10)$$

(wherein D is a hydrogen atom, a methyl group or a hydroxyl group, Q is a direct bond or an oxygen atom, and n is 5 to 10,000) or the general formula (11):

$$\text{-(M)}_x\text{-} \quad (11)$$

(wherein M represents a hydrophilic monomer unit selected from NMMP, N-VP, (meth)acrylic acid, (meth)acrylate, N,N-dimethylacrylamide, N,N-diethylacrylamide, 2-hydroxyethyl(meth)acrylate, tetrahydrofuran, oxetane, oxazoline, 2-methacryloyloxyethylphosphorylcholine and the like, polymerization chains of polymers structured therefrom may be in the state of a linear chain or a branched chain, or may bond in the random state or the block state. X is 5 to 10,000)] is bonded with a siloxane main chain through at least one urethane bond.

The urethane group-containing polysiloxane macromonomer may further contain a hydrophilic polymer structure. Due to this structure, compatibility of the urethane group-containing polysiloxane macromonomer and a hydrophilic monomer is improved, and wetting property of materials comprising thereof can be improved. An example of the structure of the hydrophilic polymer portion is not less than one polymer obtained by polymerizing zwitter ionic group-containing monomers such as polyethylene glycol, polypropylene glycol, polyvinyl alcohol, polyvinyl pyrrolidone, poly(meth)acrylic acid, poly(meth)acrylate, poly(2-hydroxyethyl(meth)acrylate), polytetrahydrofuran, polyoxetane, polyoxazoline, polydimethylacrylamide, polydiethylacrylamide, and poly(2-methacryloyloxyethylphosphorylcholine). A molecular weight of this hydrophilic polymer structure portion is 100 to 1,000,000 and preferably 1,000 to 500,000. When the molecular weight is less than 100, there is a tendency that sufficient hydrophilicity enough to dissolve the urethane group-containing polysiloxane macromonomer in the hydrophilic monomer can not be provided. On the other hand, when the molecular weight is more than 1,000,000, domains of hydrophilicity and hydrophobicity become large, and transparent CL does not tend to be obtained.

Representative examples of the urethane group-containing polysiloxane macromonomer are a compound represented by the following formula:

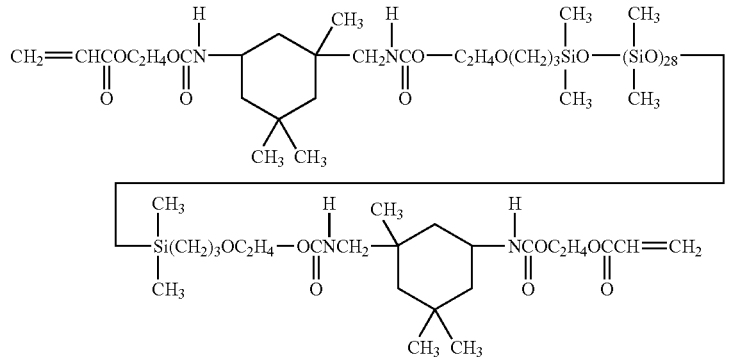

and a compound represented by the following formula:

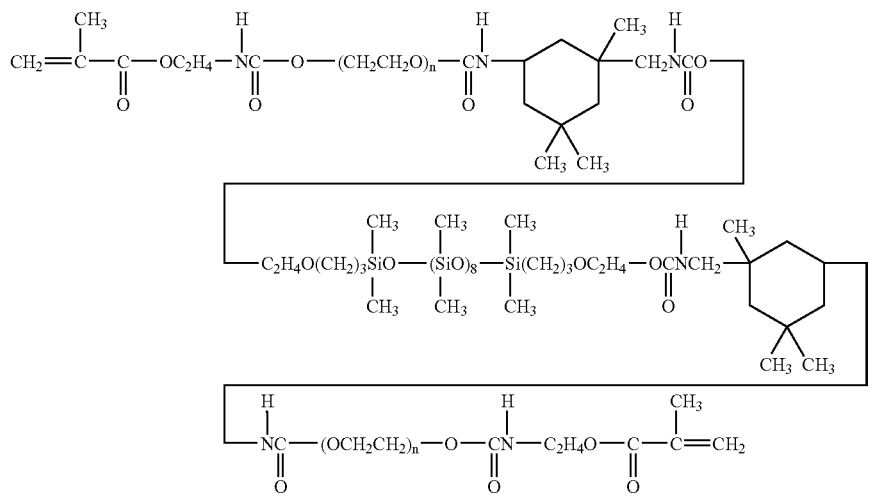

These can be used alone, or at least two kinds thereof can be mixed to be used.

An amount of a silicone-containing monomer in a hard portion-forming monomer mixture is preferably 20 to 90% by weight in the whole polymerization components in the hard portion-forming monomer mixture, and more preferably 40 to 80% by weight. When the amount is less than 20% by weight, an oxygen permeation coefficient (Dk) tends to be low, and when the amount is more than 90% by weight, lipid adhesion tends to be large.

The CL of the present invention contains at least one common hydrophilic monomer in the hard portion-forming monomer mixture and the soft portion-forming monomer mixture. Herein, a hydrophilic monomer refers to a monomer having not less than 5% of a water content as a homopolymer thereof.

When at least one common hydrophilic monomer is contained in the hard portion-forming monomer mixture and the soft portion-forming monomer mixture, at the time of injecting the hard portion-forming monomer mixture in a desired part of a copolymer obtained by polymerizing the soft portion-forming monomer mixture, the hard portion-forming monomer mixture easily impregnates into the soft portion which is already turned to be a copolymer, and a CL having improved joint strength between the hard portion and the soft portion can be obtained.

On the other hand, when the hydrophilic monomer is not contained in the hard portion-forming monomer mixture, impregnation of the hard portion-forming monomer mixture into the copolymer obtained by polymerizing the soft portion-forming monomer mixture does not proceed, and the obtained copolymer can not obtain sufficient joint strength in a joint part of a soft portion and a hard portion. In addition, although a hydrophilic monomer is contained in the hard portion-forming monomer mixture and the soft portion-forming monomer mixture, if a common hydrophilic monomer is not contained in the both forming monomer mixtures, sufficient joint strength can not be obtained since the interpenetrating polymer network (IPN) is not adequately formed. This feature of the invention is shown in FIG. 1 where hard portion 1 and soft portion 2 of a contact lens of the present invention have a phase boundary 3 of common hydrophilic components at an interpenetrating polymer network formed in a joint part between the soft and hard portions wherein the hard portion-forming mixture is impregnated in the copolymer obtained by polymerizing the soft portion-forming monomer mixture.

Examples of the hydrophilic monomer are (1) hydroxyl group-containing alkyl (meth)acrylates (for example, hydroxyalkyl (meth)acrylates such as hydroxymethyl (meth)acrylate, hydroxyethyl (meth)acrylate, hydroxypropyl (meth)acrylate, hydroxybutyl (meth)acrylate and hydroxypentyl (meth)acrylate, and dihydroxyalkyl (meth)acrylates such as dihydroxypropyl (meth)acrylate, dihydroxybutyl (meth)acrylate and dihydroxypentyl (meth)acrylate);

(2) (meth)acrylamide monomers (for example, N,N-dialkyl (meth)acrylamide such as N,N-dimethyl (meth)acrylamide, N,N-diethyl (meth)acrylamide and N,N-dipropyl (meth)acrylamide, and N,N-dialkylaminoalkyl (meth)acrylamide such as N,N-dimethylaminopropyl (meth)acrylamide and N,N-diethylaminopropyl (meth)acrylamide);

(3) N-vinyllactams (for example, N-vinylpyrrolidone, N-vinylpiperidone and N-vinylcaprolactam); and (4) hydrophilic monomers other than those examples described above (for example, diethylene glycol mono (meth)acrylate, triethylene glycol mono(meth)acrylate, propylene glycol mono(meth)acrylate, (meth)acrylic acid, methoxyethyl (meth)acrylate, ethoxyethyl (meth)acrylate, maleic anhydride, maleic acid, derivatives of maleic acid, fumaric acid, derivatives of fumaric acid, aminostyrene and hydroxystyrene). These can be used alone or at least two kinds thereof can be mixed to be used. Among these, a hydroxyl group-containing alkyl (meth)acrylate is preferable from the viewpoint that it is conventionally used as a CL material, it has a suitable water content and the water content is easily adjusted, and impregnation of a joint part is easily proceeded, particularly, hydroxymethyl (meth)acrylate, hydroxyethyl (meth)acrylate, hydroxybutyl (meth)acrylate and hydroxypropyl (meth)acrylate which are hydroxyl group-containing alkyl (meth)acrylates having about 1 to 4 carbon atoms in the alkyl group are more preferable.

An amount of the hydrophilic monomer in the hard portion-forming monomer mixture is preferably 1 to 50% by weight in the whole polymerization components in the hard portion-forming monomer mixture, and more preferably 3 to 20% by weight. When the amount is less than 1% by weight, there is a tendency that sufficient joint strength can not be obtained in a joint part of the hard portion and the soft portion, and when the amount is more than 50% by weight, an oxygen permeation coefficient (Dk) tends to be lowered.

In the present invention, comparing a water content of a homopolymer obtained by polymerizing a hydrophilic monomer having the maximum water content as being a homopolymer in the hard portion-forming monomer mixture (hereinafter, referred to as a hard portion-forming maximum water absorption hydrophilic monomer) with a water content of a homopolymer obtained by polymerizing a hydrophilic monomer having the maximum water content as being a homopolymer in the soft portion-forming monomer mixture (hereinafter, referred to as a soft portion-forming maximum water absorption hydrophilic monomer), it is preferable that the water content of the hard portion-forming maximum water absorption hydrophilic monomer as being a homopolymer does not exceed the water content of the soft portion-forming maximum water absorption hydrophilic monomer as being a homopolymer.

If the water content of the hard portion-forming maximum water absorption hydrophilic monomer as being a homopolymer exceeds the water content of the soft portion-forming maximum water absorption hydrophilic monomer as being a homopolymer, when the obtained copolymer is processed by cutting into the shape of a CL and absorbs water, a joint part of the hard portion and the soft portion is locally swelled, and feeling during the use tends to be uncomfortable.

Herein, the water content is calculated from the formula shown in the following:

Water content (%)=[(amount of polymer after absorbing water−amount of polymer before absorbing water)/amount of polymer after absorbing water]×100

Specifically, the water content of the hard portion-forming maximum water absorption hydrophilic monomer as being a homopolymer is preferably 5 to 50% by weight, and more preferably 7 to 40% by weight. When it is less than 5% by weight, there is a tendency that sufficient joint strength can not be obtained in a joint part of the hard portion and the soft portion, and when it is more than 50% by weight, the hydrophilic monomer is selectively impregnated in case of impregnating a CL, and the joint part tends to be excessively swelled.

In the present invention, it is preferable that a weight ratio of the hard portion-forming maximum water absorption hydrophilic monomer in the whole polymerization components in the hard portion-forming monomer mixture does not exceed a weight ratio of the soft portion-forming maximum water absorption hydrophilic monomer in the whole polymerization components in the soft portion-forming monomer mixture, and at the same time, a weight ratio of the whole hydrophilic monomer contained in the hard portion-forming monomer mixture to the whole polymerization components in the hard portion-forming monomer mixture does not exceed a weight ratio of the whole hydrophilic monomer contained in the soft portion-forming monomer mixture to the whole polymerization components in the soft portion-forming monomer mixture.

If these conditions are not satisfied, when the obtained copolymer is processed by cutting into the shape of a CL and absorbs water, a joint part of the hard portion and the soft portion tends to be locally swelled. As described above, if the joint part of the hard portion and the soft portion is locally swelled when the CL absorbs water, feeling during the use thereof tends to be uncomfortable.

Herein, the whole polymerization components are referred to as polymerizable monomers and a crosslinking agent excluding additives such as an ultraviolet absorber, a dye, an ultraviolet absorbing dye and a polymerization initiator.

Specifically, an amount of the hard portion-forming maximum water absorption hydrophilic monomer is preferably 1 to 50% by weight in the whole polymerization components in the hard portion-forming monomer mixture, and more preferably 3 to 20% by weight. When the amount is less than 1% by weight, there is a tendency that sufficient joint strength can not be obtained in a joint part of the hard portion and the soft portion, and when it is more than 20% by weight, an oxygen permeation coefficient (Dk) tends to be lowered.

An amount of the whole hydrophilic monomer in the hard portion forming-monomer mixture is preferably 1 to 50% by weight in the whole polymerization components in the hard portion forming-monomer mixture, and more preferably 3 to 20% by weight. When the amount is less than 1% by weight, there is a tendency that sufficient joint strength can not be obtained in a joint part of the hard portion and the soft portion, and when it is more than 50% by weight, an oxygen permeability coefficient (Dk) tends to be lowered.

An ratio of a water content of a homopolymer obtained by polymerizing a hydrophilic monomer commonly contained in the hard portion-forming monomer mixture and the soft portion-forming monomer mixture to a water content of a copolymer obtained by polymerizing the soft portion-forming monomer mixture is preferably not more than 2, and more preferably not more than 1.5. If this ratio is more than 2, when the CL absorbs water, a joint part of the hard portion and soft portion is inflated due to locally swelling, resulting in not forming the favorable CL shape, and feeling during the use tends to be deteriorated since this swelled part puts pressure on corneas. In addition, the ratio is preferably not less than 0.1. When it is less than 0.1, there is a tendency that sufficient joint strength can not be obtained in the joint part of the soft portion and the hard portion.

Specifically, a water content of a copolymer obtained by polymerizing the soft portion-forming monomer mixture is preferably 10 to 80% by weight, and more preferably 20 to 40% by weight from the viewpoint of having vision correction ability and offering favorable feeling during the use.

In the present invention, a ratio of a water content of a homopolymer of the hydrophilic monomer contained in the hard portion-forming monomer mixture to a water content of a copolymer obtained by polymerizing the soft portion-forming monomer mixture is preferably not more than 2, and more preferably not more than 1.5. Further, this ratio is preferably not less than 0.1. When it is less than 0.1, there is a tendency that sufficient joint strength can not be obtained in a joint part of the hard portion and the soft portion.

Since an oxygen permeable CL comprises a silicone material as a base material, surface wetting property is poor. Therefore, the surface wet property is improved by adding a hydrophilic monomer having a high water content such as methacrylic acid and N-vinylpyrrolidone.

However, when a ratio of a water content of a homopolymer of the hydrophilic monomer added to the hard portion-forming monomer mixture to a water content of a copolymer obtained from the soft portion-forming monomer mixture exceeds 2, the hydrophilic monomer contained in the hard portion-forming monomer mixture is selectively impregnated in the copolymer forming the soft portion, and the hydrophilic monomer locally exists in the border between the hard portion and the soft portion, resulting in occurring excessive swelling. Namely, when a block copolymerized by flowing the hard portion-forming monomer mixture into the central part of a soft material is processed by cutting into the CL shape and absorbs water, the joint part of the hard portion and the soft portion is inflated due to local swelling, and feeling during the use tends to be deteriorated since this swelled part puts pressure on corneas.

In the present invention, the hard portion-forming monomer mixture and the soft portion-forming monomer mixture may contain generally known monomers and/or macromonomers forming a CL other than the above-described silicone-containing monomer, hydrophilic monomer and the like.

When the antifouling property of the obtained CL is intended to be improved, a fluorine-containing monomer that is a polymerizable compound in which a part of hydrogen atoms in a hydrocarbon group are substituted with fluorine atoms can be used.

An example of the above-described fluorine-containing monomer is a monomer represented by the general formula (III):

(wherein $R^1$ is a hydrogen atom or $CH_3$, s is an integer of 1 to 15, t is an integer of 1 to (2s+1), and u is 0 or an integer of 1 or 2).

Representative examples of the monomers represented by the general formula (III) are 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5, 5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,5,6,6,7,7,8,9,9,9-dodecafluoro-8-trifluoromethylnonyl (meth) acrylate, and 2-hydroxy-4,4,5,5,6,6,7,7,8,8,9,9,10,11,11,11-hexadecafluoro-10-trifluoromethylundecyl (meth)acrylate.

Among the above-described fluorine-containing monomers, 2,2,2-trifluoroethyl (meth)acrylate and 2,2,2,2',2',2'-hexafluoroisopropyl (meth) acrylate are particularly preferable from the viewpoint that an effect of improving antifouling property of the obtained optical material is large.

The above-described fluorine-containing monomers can be used alone or at least two kinds thereof can be mixed to be used, and the amount thereof may be suitably adjusted according to properties of the desired CL.

When hardness of the obtained CL is adjusted to provide hardness or softness, for example, hardness adjusting monomers such as alkyl (meth)acrylates and alkylstyrenes which are polymerizable compounds having an alkyl group, and styrene can be used.

Examples of the alkyl (meth)acrylates are linear chain-, branched chain-, or cyclic alkyl (meth)acrylates such as methyl (meth)acrylate, ethyl (meth)acrylate, isopropyl (meth)acrylate, n-propyl (meth)acrylate, isobutyl (meth) acrylate, n-butyl (meth)acrylate, 2-ethylhexyl (meth)acrylate, n-octyl (meth)acrylate, n-decyl (meth)acrylate, n-dodecyl (meth)acrylate, t-butyl (meth)acrylate, pentyl (meth) acrylate, t-pentyl (meth)acrylate, hexyl (meth)acrylate, heptyl (meth)acrylate, nonyl (meth)acrylate, stearyl (meth) acrylate, cyclopentyl (meth)acrylate, and cyclohexyl (meth) acrylate; alkoxyalkyl (meth)acrylates such as 2-ethoxyethyl (meth)acrylate, 3-ethoxypropyl (meth)acrylate, 2-methoxyethyl (meth)acrylate, and 3-methoxypropyl (meth)acrylate; and alkylthioalkyl (meth)acrylates such as ethylthioethyl (meth)acrylate and methylthioethyl (meth)acrylate.

Examples of the alkylstyrenes are α-methylstyrene; alkylstyrenes such as methylstyrene, ethylstyrene, propylstyrene, butylstyrene, t-butylstyrene, isobutylstyrene and pentylstyrene; and alkyl-α-methylstyrenes such as methyl-α-methylstyrene, ethyl-α-methylstyrene, propyl-α-methylstyrene, butyl-α-methylstyrene, t-butyl-α-methylstyrene, isobutyl-α-methylstyrene and pentyl-α-methylstyrene.

When a soft CL is intended to be obtained, among the above-described hardness adjusting monomers, it is preferable to use monomers which are polymerized to be homopolymers having a glass transition temperature (hereinafter, referred to as Tg) of not more than 40° C. Further, when a hard CL is intended to be obtained, it is preferable to use monomers which are polymerized to be homopolymers having a Tg of more than 40° C. In addition, styrene, alkyl (meth)acrylate and alkylstyrene are particularly preferable from the viewpoint that compatibility and copolymerizability with other polymerization components are excellent.

These hardness adjusting monomers can be used alone, or at least 2 kinds thereof can be mixed to be used, and the amount thereof may be suitably adjusted according to materials of the desired CL.

In the present invention, it is possible according to the necessity that various additives conventionally used for a CL in general, for example, polymerizable- or non-polymerizable ultraviolet absorbers, dyes and ultraviolet absorbing dyes are copolymerized, existing in copolymerization components forming a soft portion and/or a hard portion, or are added after polymerizing in order to provide ultraviolet absorptive ability or to color the CL. The followings can be exemplified as compositions which can be particularly considered.

(1) soft portion: ultraviolet absorber hard portion: dye+ultraviolet absorber
(2) soft portion: dye+ultraviolet absorber hard portion: ultraviolet absorber Examples of the ultraviolet absorber are benzophenone ultraviolet absorbers and benzotriazole ultraviolet absorbers.

Examples of polymerizable benzophenone ultraviolet absorbers are 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)benzophenone.

Examples of polymerizable benzotriazole ultraviolet absorbers are 2-(5-chloro-2H-benzotriazole-2-yl)-6-(1,1-dimethylethy)-4-methylphenol, 2-(2'-hydroxy-5'-(meth) acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropyl-3'-tert-butylphenyl)-5-chloro-2H-benzotriazole, 2-[2'-hydroxy-5'-(2"-(meth)acryloyloxyethoxy)-3'-tert-butylphenyl]-5-methyl-2H-benzotriazole, and 2-[2'-hydroxy-5'-(2"-(meth)acryloyloxypropoxy)-3'-tert-butylphenyl]-5-methyl-2H-benzotriazole.

Polymerizable ultraviolet absorbers having the same chemical structure portion as these ultraviolet absorbers and having a functional group polymerizable with the polymerization components in the present invention can be used. These can be used alone or at least two kinds thereof can be mixed to be used.

Dyes are not particularly limited besides that the safety for living bodies is required, and dyes (non-polymerizable dyes and polymerizable dyes) used in the fields of food and pharmaceuticals are selected.

Examples of the non-polymerizable dyes are 1,4-bis[(4-methylphenyl)amino]-9,10-anthoraquinon (D&C Green No.6), 1-[[4-(phenylazo)phenyl]azo]-2-naphthalenol (D&C Red No. 17), 1-hydroxy-4-[(4-methylphenyl)amino]-9,10-anthoraquinon (D&C Violet No.2), 2-(2-quinolyl)-1,3-indanedione (D&C Yellow No. 11), 4-[(2,4-dimethylphenyl)azo]-2,4-dihydro-5-methyl-2-phenyl-3H-pyrazole-3-on (C.I Solvent Yellow 18), and 2-(1,3-dioxo-2-indanyl)-3-hydroxyquinoline (MACROL EX (trademark) Yellow-G).

Specific examples of the polymerizable dyes are polymerizable azo dyes, polymerizable anthraquinone dyes, polymerizable nitro dyes and polymerizable phthalocyanine dyes.

Examples of polymerizable azo dyes are 1-phenylazo-4-(meth)acryloyloxynaphthalene, 1-phenylazo-2-hydroxy-3-(meth)acryloyloxynaphthalene, 1-naphtylazo-2-hydroxy-3-(meth)acryloyloxynaphthalene, 1-(α-anthrylazo)-2-hydroxy-3-(meth)acryloyloxynaphthalene, 1-((4'-phenylazo)phenyl)azo-2-hydroxy-3-(meth) acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 3-(meth)acryloylamide-4-phenylazophenol, 3-(meth)acryloylamide-4-(8'-hydroxy-3',6'-disulfo-1 '-naphthylazo)-phenol, 3-(meth)acryloylamide-4-(1'-phenylazo-2'-naphthylazo)-phenol, 2-phenylazo-4-(2-(meth)acryloyloxyethoxy)-6-tert-butylphenol, 2-phenylazo-4-(2-(meth)acryloyloxypropoxy)-6-tert-butylphenol, 3-(meth)acryloylamide-4-(p-tolylazo)phenol, 4-phenylazo-7-(meth)acryloylamide-1-naphthol, 2-(m-vinylanilino)-4-((p-nitrophenylazo)-anilino)-6-chloro-1,3,5-triazine, 2-(1-(o-tolylazo)-2'-naphthyloxy)-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic monoamide, N-(1'-(o-tolylazo)-2'-naphthyl)-6-vinylphthalic monoamide, 3-vinylphthalic-(4'-(p-sulfophenylazo)-1'-naphthyl) monoester, 6-vinylphthalic-(4'-(p-sulfophenylazo)-1'-naphthyl) monoester, 2-amino-4-(m-(2'-hydroxy-1'-naphthylazo) anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo) anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo) anilino)-6-isopropenyl-1,3,5-triazine, and 2-amino-4-(p-phenylazoanilino)-6-isopropenyl-1,3,5-triazine.

Examples of the polymerizable anthraquinone dyes are 1,5-bis((meth)acryloylamino)-9,10-anthraquinone, 1-amino-4-(3'-(meth)acryloylaminophenylamino)-9,10-anthraquinone-2-sulfonic acid, 2-(3'-(meth)acryloylamide-anilino)-4-(3'-(3''-sulfo-4''-aminoanthraquinone-1''-yl)-amino-anilino)-6-chloro-1,3, 5-triazine, 2-(3'-(meth)acryloylamide-anilino)-4-(3'-(3''-sulfo-4''-aminoanthraquinone-1''-yl)-amino-anilino)-6-hydrazino-1,3,5-triazine, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2,4-bis-((4''-methoxyanthraquinone-1''-yl)-amino)-6-(3'-vinylanilino)-1,3,5-triazine, and 2-(2'-vinylphenoxy)-4-(4'-(3''-sulfo-4''-aminoanthraquinone-1''-yl-amino)-anilino)-6-chloro-1,3,5-triazine.

An example of the polymerizable nitro dyes is o-nitroanilinomethyl (meth)acrylate.

Examples of the polymerizable phthalocyanine dyes are (meth)acryloylated tetraamino copper phthalocyanine and (meth)acryloylated (dodecanoylated tetraamino copper phthalocyanine).

Examples of the ultraviolet absorbing dyes are polymerizable ultraviolet absorbing dyes such as 2,4-dihydroxy-3-(p-(meth)acryloyloxymethylphenylazo)benzophenone, 2,4-dihydroxy-5-(p-(meth)acryloyloxymethylphenylazo) benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo) benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo) benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth) acryloyloxypropylphenylazo) benzophenone, 2,4-dihydroxy-3-(p-(N,N-di(meth)acryloyloxyethylamino)phenylazo) benzophenone, 2,4-dihydroxy-5-(p-N,N-di(meth)acryloyloxyethylamino)phenylazo) benzophenone, 2,4-dihydroxy-3-(o-N,N-di(meth)acryloyloxyethylamino)phenylazo) benzophenone, 2,4-dihydroxy-5-(o-(N,N-di(meth)acryloyloxyethylamino)phenylazo) benzophenone, 2,4-dihydroxy-3-(p-(N-ethyl-N-(meth)acryloyloxyethylamino)phenylazo) benzophenone, 2,4-dihydroxy-5-(p-(N-ethyl-N-(meth)acryloyloxyethylamino)phenylazo) benzophenone, 2,4-dihydroxy-3-(o-(N-ethyl-N-(meth)acryloyloxyethylamino)phenylazo) benzophenone, 2,4-dihydroxy-5-(o-(N-ethyl-N-(meth)acryloyloxyethylamino)phenylazo) benzophenone, 2,4-dihydroxy-3-(p-(N-ethyl-N-(meth)acryloylamino)phenylazo) benzophenone, 2,4-dihydroxy-5-(p-(N-ethyl-N-(meth)acryloylamino)phenylazo) benzophenone, 2,4-dihydroxy-3-(o-(N-ethyl-N-(meth)acryloylamino)phenylazo) benzophenone, 2,4-dihydroxy-5-(o-(N-ethyl-N-(meth)acryloylamino)phenylazo) benzophenone, 2,4-dihydroxy-3-(p-styrenoazo)benzophenone, 2,4-dihydroxy-5-(p-styrenoazo)benzophenone, and phenyl 2-hydroxy-4-(p-styrenoazo) benzoate. These may be used alone or at least two kinds thereof may be used in combination.

Amounts of the ultraviolet absorbers and the dyes in the mixture of the monomer components and a crosslinking agent may be the same or different in the soft portion and the hard portion, but considering that the amounts are largely affected by a thickness of materials, it is generally desirable that on the basis of 100 parts by weight of the mixture of the monomer components and the crosslinking agent, an amount of an ultraviolet absorber is 0.01 to 1 part by weight, and an amount of a dye and an ultraviolet absorbing dye is 0.001 to 0.1 part by weight. However, these amounts may be suitably adjusted according to uses of the desired CL, and are not particularly limited.

When amounts of the ultraviolet absorber and the dye are excessive, there is a possibility of lowering mechanical strength of a CL and the problem of lowering its transparency is also caused. Further, when the CL is used in contact with living tissues, the amounts thereof should be adjusted by considering toxicity of ultraviolet absorbers, dyes and ultraviolet absorbing dyes.

When mechanical strength and durability (shape stability) of the obtained CL are intended to be improved, and water resistance and solvent resistance are intended to be imparted to the CL, it is preferable to use a crosslinking monomer which is a polyfunctional polymerizable compound having at least two copolymerizable unsaturated double bonds.

Specific examples of the crosslinking monomer are ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl(meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl(meth)acrylate, 3-vinylbenzyl(meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl) propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene and 1,2-bis(2-(meth)acryloyloxyisopropyl)benzene.

Among the above crosslinking monomers, ethylene glycol di(meth)acrylate and 4-vinylbenzyl (meth)acrylate are particularly preferable from the viewpoint that compatibility with other polymerization components is excellent, and effects of improving mechanical strength and durability (shape stability) of the obtained CL are significant.

The above-described crosslinking monomers can be used alone, or at least two kinds thereof can be mixed to be used, and the amount thereof may be suitably adjusted according to properties of the desired CL, but when the crosslinking monomer is used, the amount is preferably not less than 0.01% by weight of the polymerization component, particularly preferably not less than 0.5% by weight in order to sufficiently exhibit effects of improving durability (shape stability) in particular, and the amount is preferably not more than 15% by weight, particularly preferably not more than 12% by weight in order to avoid possibility that the CL becomes brittle.

In the present invention, the above-described monomer mixture is adjusted in the desired amount, thereto is added a radical polymerization initiator to be polymerized by a general process, thereby, a polymer can be obtained.

The general process refers to, for example, a process of carrying out polymerization by gradually heating within the temperature range from a room temperature to about 130° C. after adding a radical polymerization initiator, or by irradiating electromagnetic waves such as a micro wave, an ultraviolet ray and a radioactive ray (γ ray). In the case of polymerizing with heat, the temperature may be gradually increased. The polymerization may be carried out by a mass polymerization method, a solution polymerization method using a solvent etc, or other methods may be used.

Representative examples of the radical polymerization initiators are azobisisobutyronitrile, azobisdimethylvaleronitrile, benzoyl peroxide, t-butyl hydroperoxide, and cumenehydroperoxide. These may be used alone or at least two kinds thereof may be used in mixing. In addition, when polymerization is carried out by utilizing light rays, it is preferable to further add a photo polymerization initiator and a sensitizer. An amount of the photo polymerization initiator and sensitizer is preferably about 0.01 to 2 parts by weight on the basis of 100 parts by weight of the whole amount of the polymerization components, and particularly preferably about 0.01 to 1 part by weight.

It is preferable to add a desired amount of a water-soluble solid inert substance or water to the soft portion-forming monomer mixture in order to suppress distortion due to difference in expansion between the hard portion and its periphery.

Examples of the water-soluble solid inert substance are:
(1) polyethylene glycol, polypropylene glycol and polybutylene glycol which have an average molecular weight of 1,000 to 100,000;
(2) polyoxyethylene glycol, polyoxypropylene glycol and polyoxybutylene glycol which have an average molecular weight of 1,000 to 100,000;
(3) benzoic acid, doric acid and napsoic acid;
(4) esters or ethers of polyoxyethylene glycol, polyoxypropylene glycol and polyoxybutylene glycol which have an average molecular weight of 1,000 to 100,000;
(5) soaps and surfactants;
(6) polyvinylpyrrolidone, polyvinylcaprolactam and polyvinyl piperidone;
(7) N-acetylpolyethyleneimine; and
(8) poly-N-vinylimidozole, poly-N-vinylsuccinimide and poly-N-vinylglutarimide.

It is preferable to use a water-soluble solid inert substance having an average molecular weight of preferably 1,000 to 10,000, and more preferably 2,000 to 6,000 from the viewpoint of easiness of removing the water-soluble solid inert substance from a CL (polymer) after processing into a CL shape and processability by cutting into the CL shape. When the average molecular weight of the water-soluble solid inert substance is less than 1,000, processability by cutting tends to be lowered. When the average molecular weight is more than 10,000, easiness of removing the water-soluble solid inert substance from the CL (polymer) after processing into a CL shape tends to be lowered.

As the water-soluble solid inert substance, polyethylene glycol, polypropylene glycol or polybutylene glycol having the above-mentioned average molecular weight is preferable from the viewpoint that these are easily dissolved in a monomer mixture and easily removed after polymerization.

An amount of the water-soluble solid inert substance into the soft portion-forming monomer mixture is approximately equivalent to a water content of the polymer obtained by polymerizing the soft portion-forming monomer mixture, namely, a volume of saturated water capable of being contained in the polymer is calculated from the water content of the polymer obtained by polymerizing the soft portion-forming monomer mixture, therefrom the amount of the water-soluble solid inert substance is calculated, considering a specific gravity of the water-soluble solid inert substance.

A weight of the water-soluble solid inert substance added to the soft portion-forming monomer mixture can be obtained from the following formula. About ±20% of a weight (g) of the inert substance obtained by this formula is preferable, and a ±15% of a weight (g) of the inert substance is more preferable. If the weight is out of this range, when the water-soluble solid inert substance is removed, the shape of the soft portion is changed, and there is a tendency that the desired CL shape can not be obtained.

> Water content of copolymer (%)={(weight of water-soluble solid inert substance/specific gravity of water-soluble solid inert substance)/[weight of soft portion+(weight of water-soluble solid inert substance/specific gravity of water-soluble solid inert substance)]}×100

As a process of removing the water-soluble solid inert substance, the water-soluble solid inert substance is extracted and removed by impregnating in a solvent such as water after processing into the CL shape.

The CL of the present invention can be prepared, for example, by a preparation process comprising:
(a) a step of obtaining a cylindrical copolymer as a soft portion by polymerizing a monomer mixture containing at least one hydrophilic monomer;
(b) a step of making a through-hole concentric with the outer diameter on the obtained copolymer;
(c) a step of polymerizing, in the through-hole, the monomer mixture comprising at least one kind of silicone-containing monomer and at least one kind of a hydrophilic monomer common to the soft portion material; and
(d) a step of processing the obtained copolymer by cutting into the CL shape.

Regarding the steps (a), (b) and (c), a cylindrical soft portion (copolymer) having a through-hole concentric with the outer diameter is previously obtained, then, the hard portion-forming monomer mixture is filled in the through-hole and polymerized in the through-hole. By these procedures, as shown in FIG. 1, the hard portion-forming monomer mixture is impregnated in the copolymer composing the soft portion and can be copolymerized in the state of being impregnated, therefore, strength at a joint part of the soft portion and the hard portion can be improved, and also since all processes are possible on the basis of the outer diameter of the soft portion, centering of the hard portion becomes easy. On the other hand, when the soft portion-forming monomer mixture is copolymerized in the presence of the previously obtained hard portion, the soft portion-forming monomer mixture cannot be impregnated in the hard portion, thus, strength of the joint part cannot be improved. In addition, it is necessary to carry out centering of the obtained hard portion in a mold, which requires complicated procedures.

The CL of the present invention can be also prepared by using a mold of a multi-material contact lens blank and a preparation process which are described in JP-A-2000-343539.

By using this mold, a multi-material contact lens blank obtained by integrally laminating plural polymers can be molded by respectively composing specified lens parts in the plural polymers and providing a multi-material contact lens taking on an integral contact lens shape.

This mold is characterized by comprising:
(a) a bottom mold having a mold cavity surface for forming a surface of one side of a contact lens blank;
(b) at least one intermediate mold which forms an inside mold cavity molding the above-described plural polymers between the intermediate mold and the bottom mold, or between the intermediate mold and at least one of the plural polymers molded on the mold cavity surface of the bottom mold, has a convex part forming a concave part on the polymer molded in the inside mold cavity in which a raw material monomer compounding solution providing a polymer different from polymers molded by polymerization in the inside mold cavity can be contained, and is so structured as to be removable after molding the polymers in the inside mold cavity; and
(c) a top mold which is combined with the bottom mold having the polymer molded by using the above-described at least one intermediate mold on the mold cavity surface, and molds at least a part of a surface of the other side of the contact lens blank by polymerizing the raw material monomer compounding solution in the concave part, covering the concave part formed in the polymer.

Then, the CL of the present invention is explained in detail based on Examples in the following, but the present invention is not limited only thereto.

(Materials)
SiSt: tris(trimethylsiloxy)silylstyrene
Hexa-FIPMA: hexafluoroisopropyl methacrylate
VBMA: vinylbenzyl methacrylate
3FEMA: trifluoroethyl methacrylate
MMA: methyl methacrylate
HEMA: 2-hydroxyethyl methacrylate (hydrophilic monomer)
HOB: hydroxybutyl methacrylate (hydrophilic monomer)
N-VP: N-vinylpyrrolidone (hydrophilic monomer)
MAA: methacrylic acid (hydrophilic monomer)
EDMA: ethylene glycol dimethacrylate
V-65: 2,2'-azobis(2,4-dimethylvaleronitrile)
PEG #4000: polyethylene glycol (average molecular weight: 2,700 to 3,500; available from Nacalai Tesque Co., Ltd.)

EXAMPLES 1 to 8 and COMPARATIVE EXAMPLES 1 to 3

According to Table 1, a soft portion-forming monomer mixture was charged into a polypropylene (PP) cup (in the concave shape) which can form blanks with a diameter of 15 mm and a thickness of 5 mm, and the cap was covered with a polyethylene terephthalate film (PET film), and the monomer mixture was polymerized while maintaining at 60° C. for 1 hour and 80° C. for 1 hour in a hot-air circulation dryer, then, distortions were removed at 80° C. for 1 hour.

One side of the obtained soft portion blanks with a diameter of 15 mm and a thickness of 5 mm was held with a chuck, and the other side of the soft portion was processed to have an outer diameter of 13 mm. A polymethyl methacrylate (PMMA) jig was adhered to the other side finished with processing of the outer diameter. The PMMA jig was held with a chuck, and the remaining part was processed to have an outer diameter of the soft portion of 13 mm.

Further, a through-hole having a diameter of 8 mm concentric with the soft portion having a diameter of 13 mm was made (the PMMA jig was also penetrated), and the other side of the jig was processed into a cone-shaped hollow.

After placing the PET film on the bottom of the processed blanks, according to the Table 1, a hard portion-forming monomer mixture was charged in the through-hole of the soft portion and the cone-shaped hollow part, and covered with a PET film. Then, in a hot-air circulation dryer, a temperature was maintained at 35° C. for 4 hours, and after elevating the temperature to 110° C. at a temperature increasing rate of 10° C./hour, further maintained at 110° C. for 30 minutes, thereafter, gradually cooled to a normal temperature.

The inner surface of CL was processed by cutting, chucking the PMMA jig, and after the PMMA inner surface jig was separately adhered to the inner surface, the PMMA jig was detached. Then, after the outer surface of the CL was processed by cutting, chucking the PMMA jig, the PMMA inner surface jig was detached. The CL finished with the process by cutting was dipped in distilled water at 60° C. for 60 hours, and an eluting substance was treated. The CL was further dipped in a physiological salt solution for one day.

(Test method)

The following tests were carried out on the prepared CL.

<Water Content of Soft Portion>

"A weight of a polymer before absorbing water" of a copolymer obtained by polymerizing the soft portion-forming monomer mixture described in Table 1 and "a weight of the polymer after absorbing water" which had sufficiently absorbed water in distilled water at 20° C. were measured, and a water content of the soft portion was calculated by the following formula:

Water content (%)=[(weight of polymer after absorbing water−weight of polymer before absorbing water)/weight of polymer after absorbing water]

<Joint part of hard portion and soft portion>

The obtained CL was kept in the state of water being sufficiently absorbed therein, peeling conditions of the hard portion and the soft portion at cleaning the lens by scrubbing were observed, and the joint part was evaluated according to the following evaluation criteria:

◯: when the hard portion and the soft portion were not peeled;

X: when the hard portion and the soft portion were peeled.

<Swelling of Joint Part>

As a result of the test in the above-described <joint part of hard portion and soft portion>, the CL having sufficient strength at the joint part of the hard portion and the soft portion (CL evaluated as ◯) sufficiently absorbed water, and the CL was observed with a stereomicroscope (SMZ-10 manufactured by Nicon Co., Ltd.) at a magnification of about 50 times and evaluated according to the following evaluation criteria:

Existence: when swelling was observed at the joint part;

None: when swelling was not observed.

INDUSTRIAL APPLICABILITY

According to the present invention, a CL having a sufficiently high joint strength of the hard portion and the soft portion can be obtained. In the state where the CL absorbs water (in the state during the use thereof), the CL can avoid local swelling of the joint part between the hard portion and the soft portion, and offers favorable feeling during the use thereof.

According to the present invention, since the hard portion can be obtained from an oxygen permeable material, a CL excellent in optical properties, having favorable oxygen permeability, and capable of continuous uses can be provided.

Further, since the edge part of the lens, which is considered to be a cause for feeling a foreign object during the use, is composed of the soft portion, the CL offers less feeling of a foreign object and excellent feeling during the use thereof.

The invention claimed is:

1. A contact lens comprising two kinds of polymers and having a hard portion arranged in the central part of the contact lens and a soft portion arranged in the periphery of the central part, wherein a monomer mixture forming said hard portion contains at least one silicone-containing monomer, wherein the contact lens contains at least one common hydrophilic monomer in the monomer mixture forming said hard portion and a monomer mixture forming said soft portion, said common hydrophilic monomer being a monomer having not less than 5% of a water content as a homopolymer thereof, and wherein the contact lens has an oxygen permeation coefficient ($D_k$) of at least $64 \times 10^{-11}$ (cm²/sec)·(mLO₂/(mL×mmHg)).

2. The contact lens of claim 1, wherein a water content of a homopolymer of a hydrophilic monomer having the maximum water content in the monomer mixture forming said hard portion does not exceed a water content of a homopolymer of a hydrophilic monomer having the maximum water content in the monomer mixture forming said soft portion.

3. The contact lens of claim 2, wherein a weight ratio of the hydrophilic monomer which provides the homopolymer having the maximum water content in the monomer mixture forming said hard portion to the whole polymerization components in the monomer mixture forming said hard portion does not exceed a weight ratio of the hydrophilic monomer which provides the homopolymer having the maximum water content in the monomer mixture forming said soft portion to the whole polymerization components in the monomer mixture forming said soft portion, and a weight ratio of the whole hydrophilic monomers contained in the monomer mixture forming said hard portion to the whole polymerization components in the monomer mixture forming said hard portion does not exceed a weight ratio of the whole hydrophilic monomers contained in the monomer mixture forming said soft portion to the whole polymerization components in the monomer mixture forming said soft portion.

4. The contact lens of claim 1, wherein a ratio of a water content of a homopolymer of the hydrophilic monomer commonly contained in the monomer mixture forming said hard portion and the monomer mixture forming said soft portion to a water content of a copolymer obtained by polymerizing the monomer mixture forming said soft portion is not more than 2.

5. The contact lens of claim 1, wherein the hydrophilic monomer commonly contained in the monomer mixture forming said hard portion and the monomer mixture forming said soft portion is selected from the group consisting of hydroxymethyl (meth)acrylate, hydroxyethyl (meth)acrylate, hydroxybutyl (meth)acrylate, and hydroxypropyl (meth) acrylate.

6. A contact lens comprising two kinds of polymers and having a hard portion arranged in the central part of the contact lens and a soft portion arranged in the periphery of the central part, wherein a monomer mixture forming said hard portion contains at least one silicone-containing monomer, and the monomer mixture forming said hard portion and a monomer mixture forming said soft portion each contain at least one common hydrophilic monomer, wherein said silicone-containing monomer is a styrene which has a silane or a siloxane bond and is represented by the general formula (I):

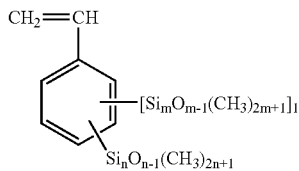
(I)

(wherein l is 0 or 1, and n and m are integers of 1 to 15).

7. The contact lens of claim 6, wherein said styrene having the silane or the siloxane bond represented by the general formula (I) is tris(trimethylsiloxy)silylstyrene (l=0, n=4).

8. The contact lens of claim 1, wherein said silicone-containing monomer is a (meth)acrylate which has a siloxane bond and is represented by the general formula (II):

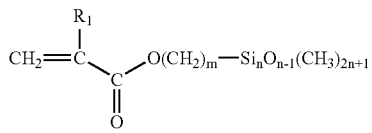
(II)

(wherein $R_1$ is H or $CH_3$, m is an integer of 1 to 5, and n is an integer of 1 to 15).

9. The contact lens of claim 8, wherein said meth(acrylate) having the siloxane bond represented by the general formula (II) is tris(trimethylsiloxy)silylpropyl acrylate ($R_1$=H, m=3, n=4) or tris(trimethylsiloxy)silylpropyl methacrylate ($R_1$=$CH_3$, m=3, n=4).

10. The contact lens of claim 1, wherein in a joint part between the hard portion and the soft portion the hard portion-forming monomer mixture is impregnated into a copolymer obtained by polymerizing the soft portion-forming mixture.

* * * * *